Figure 1:
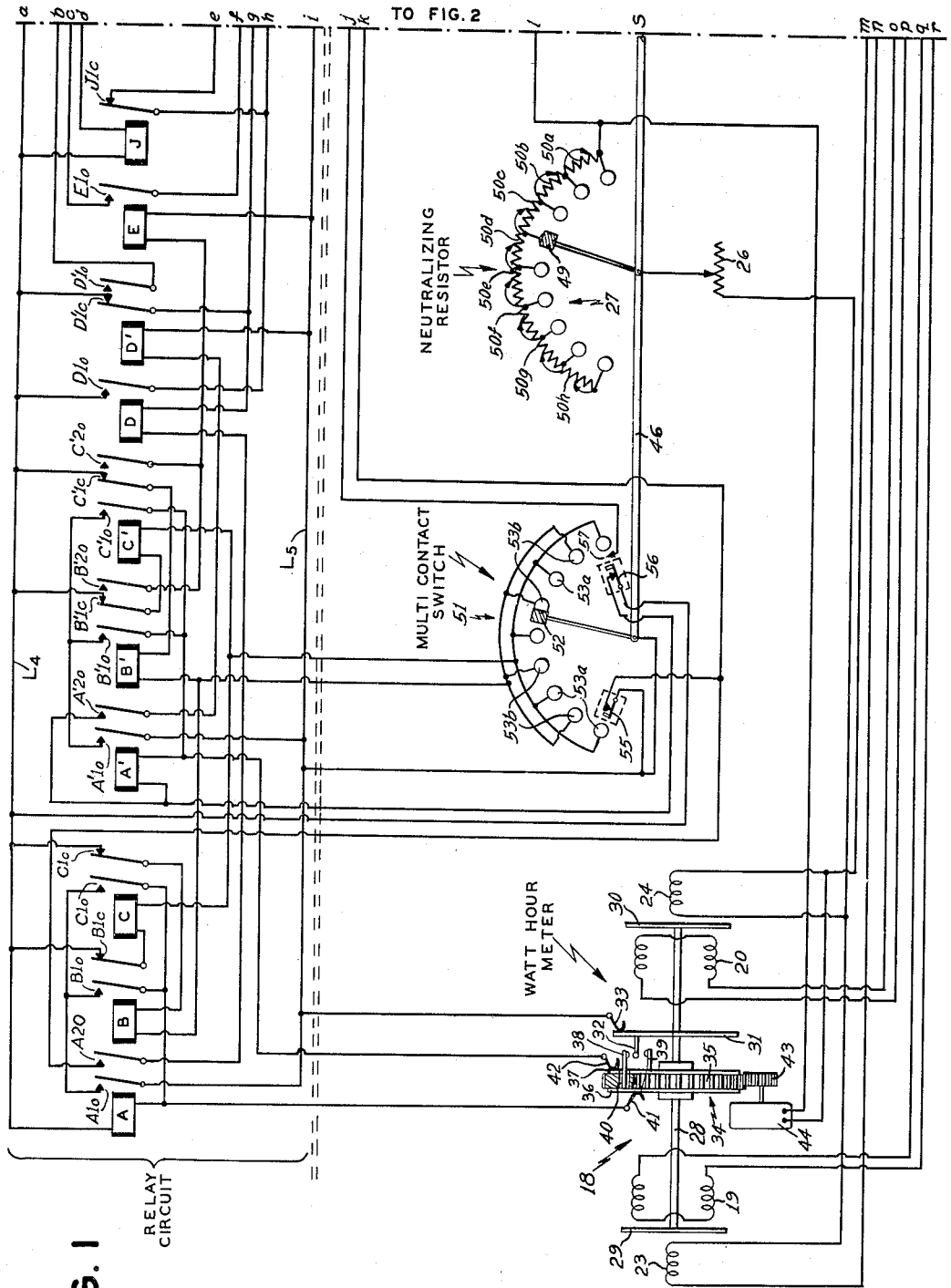

INVENTOR
*Frank Acuña Littlewood*
BY
ATTORNEYS

INVENTOR
*Frank Acuña Littlewood*
BY
ATTORNEYS

United States Patent Office 2,749,492
Patented June 5, 1956

2,749,492

ELECTRICAL CONTROL APPARATUS

Frank Acuña Littlewood, Cananea, Mexico

Application May 25, 1951, Serial No. 228,181

12 Claims. (Cl. 318—39)

This invention is directed to the provision of electrical control apparatus for controlling the operation of electrically driven devices in response to the rate of power consumption of such devices. For this purpose the new control apparatus makes use of a watt-hour meter, or of an equivalent instrument that is responsive to the rate of power consumption of the device to be controlled, as the commanding instrument by which the operation of the control system is directed. The control apparatus of the invention can also be used to control the operation of various devices, whether or not they are electrically driven, in response to changes in any measurable quantity, by utilizing as the commanding instrument a suitable measuring device by which changes that occur in such quantity can be deleted and employed to transmit appropriate control signals to the control system.

In the particular embodiment of the new control apparatus herein described, it is employed to control the rate of feed to a grinding mill in response to the rate of power consumption by the motor which drives the mill. Thereby the new control apparatus insures operation of the grinding mill with maximum efficiency and economy. It is of course understood that there are many other types of power driven devices in connection with which the new control apparatus may be used with advantage; and accordingly the references herein to the use of such control in conjunction with grinding mills are to be taken as being by way of example only and not by way of limiting the scope of the invention.

In the complete combination of the invention, a motor-driven grinding mill (or other device the operation of which is to be controlled), together with motor-driven apparatus for feeding such mill with material to be ground (or other apparatus for regulating operation of the device to be controlled), is combined with apparatus for controlling operation of the feeding or equivalent apparatus in accordance with variations that occur in the energy or rate of power consumption by the device to which the material is fed (or in accordance with variations that occur in some other measurable quantity). The control apparatus herein particularly described comprises a power measuring instrument connected to the mill motor and having a shaft which rotates at a speed determined by the rate of power consumption of such motor. A first contact element is mounted on such shaft for rotation in an orbit about the shaft axis; and a second contact element is mounted for rotation in the same orbit as the first contact element, but independently of the shaft. Means (e. g. a synchronous motor) are provided for rotating the second contact element at some predetermined reference speed. Thereby the contact elements are caused to close whenever the speed of rotation of the shaft of the power measuring instrument differs over a period of time from such predetermined reference speed of rotation of the second contact element. It is particularly advantageous for the synchronous motor which rotates the second contact element at the reference speed to be connected to the same power source as the watt-hour meter itself. Thereby any variation in the frequency of the power source which affects the speed of rotation of the watt-hour meter shaft causes a corresponding variation in the speed of the synchronous motor. In this way the instrument contacts are rendered insensitive to normal frequency variations in the power supply.

The control apparatus includes a control motor (or other electrical control means) and a source of power through which it may be actuated. Such control means is connected in circuit with the power source and with the aforesaid contact elements through a master relay circuit, so that whenever the contact elements close the control means is actuated.

When a control motor is used as the control means, it drives a shaft to which is connected a feeder motor control device (or equivalent device) for regulating operation of the feeder motor actuating the feeder apparatus by which material is fed to the grinding mill. Hence upon operation of the control motor, the feeder motor control device is actuated so as to change the rate of operation of the feeder motor and so change the rate of supply of material to the mill.

The shaft driven by the control motor also serves to actuate two additional elements in the control combination of the invention. One of these elements is a multi-contact switch, the terminals of which are connected to the aforesaid relay circuit and to the power source so that such circuit will become energized upon closure of the contact elements of the power measuring instrument, and will thereby operate to energize the control motor. When the control motor has operated for the period of time required to rotate the multi-contact switch to a new position, the connection between the relay circuit and the power source through the multi-contact switch is altered, with the result that operation of the control motor is (ordinarily) discontinued. Since the feeder motor control device and the multi-contact switch are operated together by the control motor, the extent to which a change is effected in the operation of the feeder motor is limited by the effect of the multi-contact switch in causing the control motor to become de-energized after a limited period of operation. The connections of the multi-contact switch to the relay circuit are such as to prepare the circuit for further actuation of the control motor upon the occurence of the next subsequent closure of the contacts operated by the power measuring instrument.

The second further element of the control apparatus which is driven by the control motor shaft is a variable resistor connected in circuit with the power measuring instrument itself and with the mill motor or other power consuming device. When the control motor operates to actuate the feeder motor control device and the multi-contact switch, it also changes the setting of the variable resistor, thereby in effect recalibrating the power measuring instrument. The effect of this recalibration is to bring the speed of rotation of the shaft of the power measuring instrument again substantially to the predetermined speed at which the second of the two contact elements is driven. Thereby, when an adequate adjustment has been made in the operation of the feeder motor in response to a change in the power consumption of the mill motor, a sufficient recalibration of the power measuring instrument is made to cause a separation of the instrument contact elements and so to prepare the power measuring instrument to respond to a subsequent change in the rate of power consumption of the mill motor.

When some other device than a control motor is used as the control means, e. g. when a control relay circuit is employed in its stead, then the master relay circuit may be modified to dispense altogether with the multi-contact switch, and the variable neutralizing resistor is modified so that various amounts of resistance are cut in or cut out of its circuit by energizing or de-energizing suitable relays. Also in such case the feeder motor speed control device must be modified so as to be actuated by the control means selected for use; and this in general is most readily accomplished if the speed control device is itself a variable resistance which can be arranged so that various amounts of resistance are cut in or cut out of its circuit by energizing or de-energizing relays.

A power rate measuring instrument that has been used with particular success in the new control is a watt-hour meter modified by the addition of rotatable contact elements as described above. It is to be understood, however, that other quantities than the rate of power consumption may be used effectively for directing operation of the control system, and instruments responsive to changes in such quantities may be used in such cases as the commanding or directing instrument of the control system. For example, voltmeters, ammeters, frequency meters, and other types of electrical measuring instruments, or instruments such as thermostats, pressure gauges, etc., which measure non-electrical physical quantities, may be used, with or without modification of their conventional forms, in place of the power measuring instrument to which the reference has been particularly made above.

When a control motor is employed as the control means, the master relay circuit through which the watt-hour meter or other commanding instrument and the multi-contact switch direct operation of the control motor comprises a main relay, first and second holding relays, and a control motor relay. The multi-contact switch itself comprises a movable contact element (which is the element mechanically connected to and operated by the control motor) and a series of alternate and intervening stationary contact elements. Circuit means are provided for energizing the first holding relay and for de-energizing the second holding relay when the movable contact element of the multi-contact switch is closed with any of the alternate stationary contact elements and is out of contact with the intervening stationary contact elements; and similar circuit means are provided for energizing the second holding relay and for de-energizing the first holding relay whenever said movable contact is closed with any of the intervening stationary contact elements and is out of contact with the alternate stationary contact elements of the multi-contact switch. The main relay is connected in circuit with a relay power source and with the instrument contacts so that this relay is energized upon closure of such contacts; and a holding circuit for holding the main relay energized, which is completed upon energization of the main relay, is provided through whichever of the holding relays is energized at the time the main relay becomes energized. The main relay is connected in circuit with the control motor relay so that the latter becomes energized upon energization of the main relay; and further circuit means provide for actuating the control motor upon energization of the control motor relay. Hence, upon energization of the main relay, it is held energized through its holding circuit and the control motor continues to operate, once it has been actuated following closure of the instrument contacts, until the movable contact of the multi-contact switch has been moved from one stationary contact of the multi-contact switch to the next in series with it and has thereby de-energized the holding relay through which the main relay holding circuit was completed.

Figure 2:
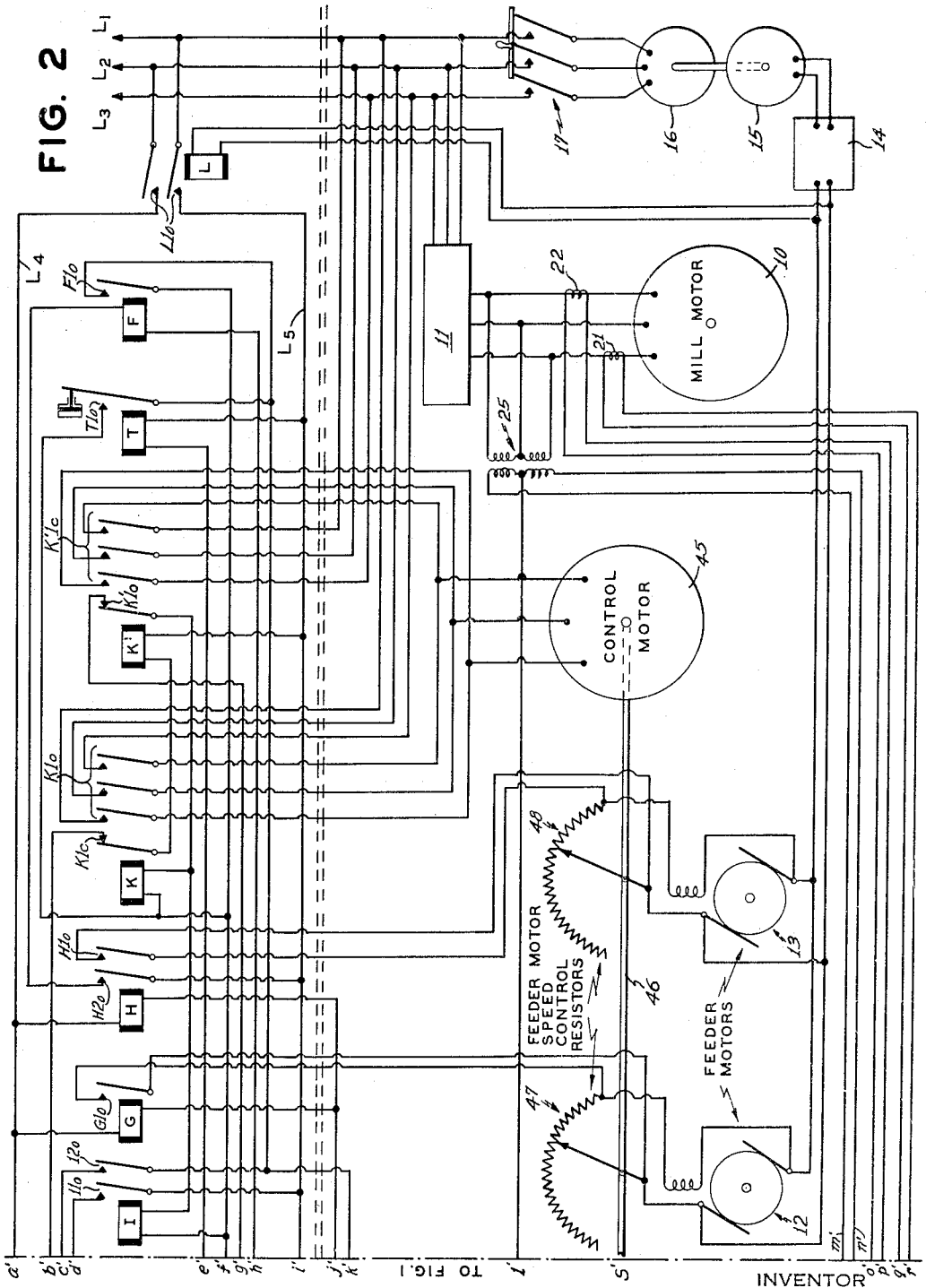
Figure 3:
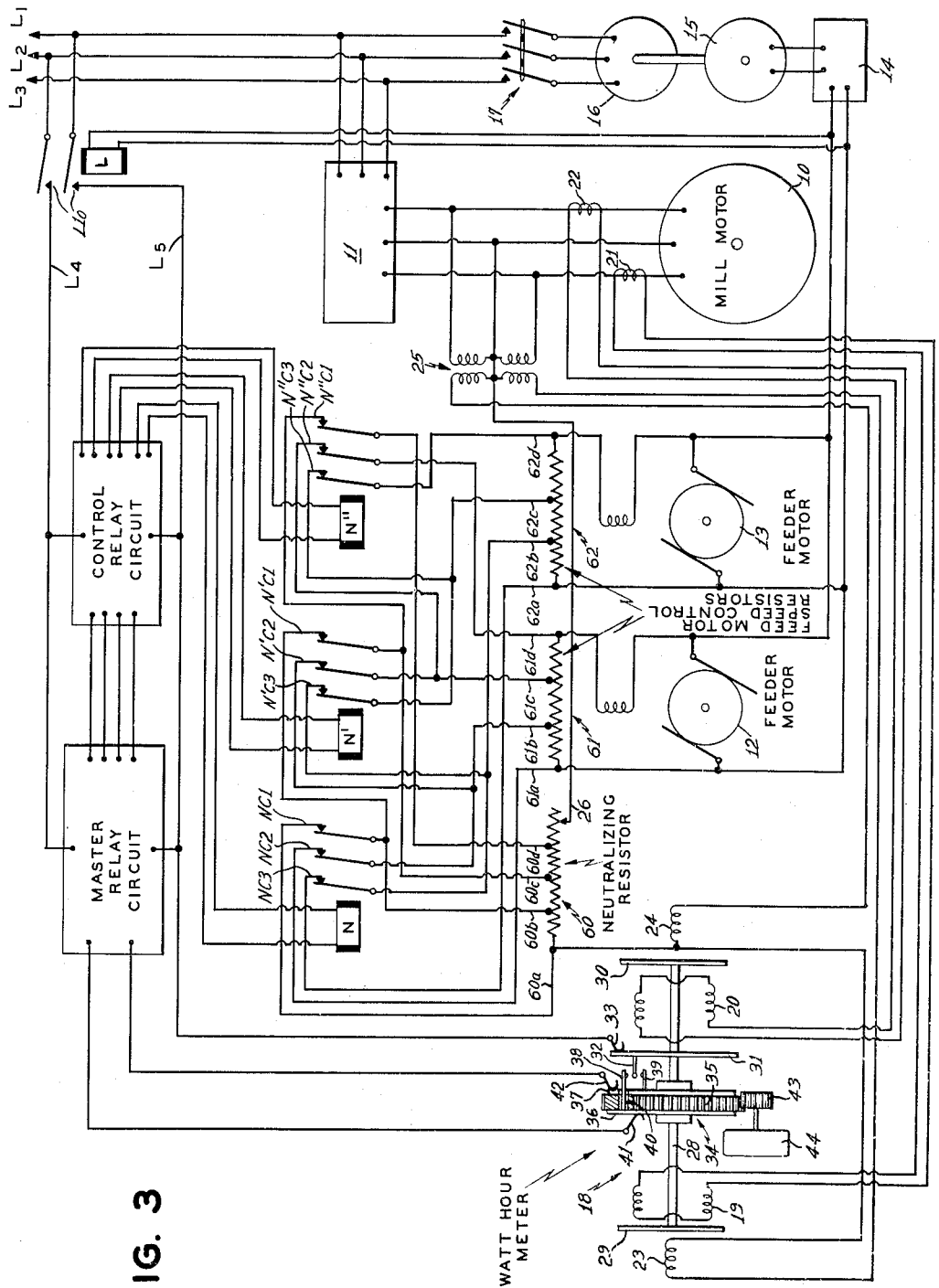

An embodiment of the new control device which has proven eminently satisfactory in service is described below with reference to the accompanying drawings, in which Figs. 1 and 2 together constitute a single schematic drawing of the new control apparatus (Figs. 1 and 2 are drawn so that by assembling them together with the lines denoted by lower case letters at the right-hand edge of Fig. 1 joined respectively to the lines denoted by the corresponding primed letters at the left-hand edge of Fig. 2, the complete schematic diagram is obtained) and Fig. 3 is a circuit diagram, partially in block form, showing a modified form of the new control apparatus.

*General arrangement and operation*

The control apparatus shown in the drawings is designed to control the feed of material, such as preliminary crushed ore, to a ball mill or other grinding mill (not shown) which is driven by a mill motor 10. The motor 10 is shown in the drawings as a three-phase motor connected through conventional starting equipment 11 to a three-phase power supply line $L_1$, $L_2$, $L_3$. The feeding of ore or other material to the mill is controlled by feeding devices (not shown) driven by feeder motors 12 and 13. The feeder motors are shown as being shunt-wound direct current motors connected through conventional starting equipment 14 to a direct current generator 15 driven by a three-phase motor 16 which is connected through a switch 17 (or other starting equipment) to the power supply line $L_1$, $L_2$, $L_3$.

The control apparatus as shown is designed to control the rate at which ore is fed to the ball mill in response to the rate at which power is consumed by the ball mill motor 10. This is accomplished by regulating the rate at which the feeder motors 12 and 13 operate in accordance with the rate of power consumption by the ball mill motor. In this manner an optimum load is maintained on the ball mill motor, and a maximum amount of ore is ground in the ball mill at a minimum power cost.

The general scheme of operation of the control apparatus is as follows: A watt-hour meter 18 which is connected to the power supply line to the ball mill motor continually senses the rate of power consumption by that motor. If the rate of such power consumption increases or decreases, indicating the need for an increased or decreased rate of feed of ore to the mill, a contact 32 actuated by the watt-hour meter closes with one or the other of a pair of mating contacts 38 and 39. Thereby a signal is transmitted to a master relay circuit, and therethrough a control motor 45 (in the apparatus of Figs. 1 and 2) or control relay circuit (in the apparatus of Fig. 3) is actuated in an appropriate manner depending on whether the signal calls for an increase or a decrease in the rate of feed to the mill. The control means operates a pair of variable resistors 47 and 48 by which the speed of the feeder motors 12 and 13 is controlled, and thus effects a suitable correction in the rate of feed to the ball mill.

In order that the watt-hour meter 18 will respond properly to the new rate of feed to the ball mill, its calibration must be changed to coincide therewith. For this purpose a variable neutralizing resistor 27 is electrically connected in circuit with the watt-hour meter and is also operated by the control means. When the control motor 45 rotates, the setting of the neutralizing resistor 27 is changed simultaneously with the adjustment of the speed of the feeder motors 12 and 13, thereby recalibrating the watt-hour meter 18 so that it will be able to respond properly to any further change in the rate of power consumption by the ball mill motor 10 that may occur while the ball mill is receiving feed at the new rate.

A substantial period of time may elapse following the change in the speed of the feeder motors 12 and 13 before the changed rate of feed is in balance with the new rate of power consumption. In the apparatus of Figs. 1 and 2, in order to limit the operation of the control motor and avoid hunting of the control, a multi-contact switch 51 having a movable contact element 52 and a series of stationary contact elements 53a and 53b is mechanically connected to the control motor shaft and is electrically connected to the relay circuit. The multi-contact switch is so arranged that it assumes control over the relay circuit, once the watt-hour meter contacts have closed, and holds the control motor in operation until the latter has rotated its shaft sufficiently to rotate the movable contact 52 from one stationary contact to the next. Thereupon the multi-contact switch, acting through the relay circuit, de-energizes the control motor (unless a further signal from the watt-hour meter calling for its continued operation is already at hand), and simultaneously prepares the relay circuit for response to the next signal from the watt-hour meter.

*Commanding instrument.—The watt-hour meter*

A three-phase watt-hour meter 18 has its current coils 19 and 20 connected in the usual manner to current transformers 21 and 22 which are energized from the power supply line leading to the mill motor 10. The potential coils 23 and 24 of the watt-hour meter each has one of its terminals connected in the conventional way respectively to one of the terminals of the secondary windings of a potential transformer 25 energized from the power line connected to the mill motor 10; and the other terminal of each of the potential coils 23 and 24 is, respectively, connected in series through a manually adjustable resistor 26 and through the variable neutralizing resistor 27 to the secondary center tap of the potential transformer 25. The watt-hour meter 18 includes the usual shaft 28 carrying armatures 29 and 30 which are positioned in the fields of the current and potential coils. When the mill motor 10 is in operation, the shaft 28 is rotated by the armatures 29 and 30 at a speed which is a function of the rate at which power is being consumed by the mill motor.

Rigidly secured to the watt-hour meter shaft 28 is a disk 31 on which the contact element 32 is eccentrically mounted. When the shaft 28 rotates, the contact element 32 rotates with it in a circular orbit about the shaft axis. This contact element is electrically connected to the disk 31, or to a slip ring mounted on the disk, and a brush 33 bearing against the disk or slip ring provides for making an electrical connection to it.

A contact carrier 34 is mounted for rotation coaxially with the watt-hour meter shaft 28, but independently thereof. As shown in the drawing the contact carrier comprises a gear 35 of insulating material journalled for rotation on the watt-hour meter shaft 28, and carrying on its opposite faces a pair of slip rings 36 and 37. The contact element 38 is mechanically supported by and electrically connected to one of these slip rings 36; and the other contact element 39 is mechanically supported by and is electrically connected to the other slip ring 37. These two contact elements 38 and 39 are spaced angularly a fixed distance apart but are located each in the same orbit of rotation about the axis of the shaft 28 as is the contact element 32 described above. To enable the contact element 38 (which is attached to the slip ring 36 on the side of the gear 35 away from the contact carrier 31) to project into the orbit of rotation of the contact element 32, it extends through aligned openings 40 in the gear 35 and in the slip ring 37. The openings 40 are sufficiently large so that there is no electrical connection between the contact element 38 and the slip ring 37. Electrical connection is made to the contact elements 38 and 39 by brushes 41 and 42, respectively, bearing against the slip rings 36 and 37 to which these contact elements are attached.

The gear 35 meshes with a pinion 43 on the shaft of a synchronous motor 44, which in turn is connected to any convenient power source (but most advantageously, as shown in the drawing, the motor 44 is connected to a winding of the potential transformer 25 which serves the potential coils of the watt-hour meter, or otherwise the motor 44 is connected to the same A. C. power source as the watt-hour meter). The synchronous motor rotates the gear 35 in the same direction as the watt-hour meter shaft 28, but at a predetermined substantially constant reference speed. The contact elements 38 and 39 thereby are rotated in a common circular orbit about the axis of the shaft 28 at this reference speed. It is evident that if the watt-hour meter shaft is rotating also at the reference speed, the contact element 32 carried thereby will remain angularly spaced from the contact elements 38 and 39; but if the speed of rotation of the watt-hour meter shaft 28 diminishes or increases with respect to the reference speed, then the contact element 32 will approach one or the other of the contact elements 38 and 39, and it will make contact therewith if the speed of rotation of the watt-hour meter shaft differs from the reference speed of rotation of the gear 35 over a period of time. The speed of rotation of the shaft 28 is of course at any given instant a function of the rate at which power is then being consumed by the mill motor 10. The reference speed of rotation of the gear 35 is selected to equal the speed of rotation of the watt-hour meter shaft 28 when the rate of power consumption by the mill motor 10 is optimum for the rate at which ore is being fed to the mill. If the rate of power consumption by the mill motor decreases or increases from the optimum value, the result is that the speed of rotation of the watt-hour meter shaft 28 departs from the reference speed of rotation of the gear 35, and the contact element 32 ultimately closes with one or the other of the contact elements 38 and 39 rotated by the gear 35.

Normal variations in the frequency of the power supply to the mill motor 10 result in a change in the speed of the mill motor and are reflected in corresponding changes in the power input to which the watt-hour meter responds. However, by connecting the synchronous motor 44 to the same power source as the watt-hour meter, the speed of rotation of the synchronous motor 44 varies in the same proportion as the watt-hour meter shaft in response to such variations in the frequency of the power supply. As a result, no false control signals are occasioned by frequency variations.

It is evident that the watt-hour meter contacts, arranged as above described, serve to integrate small departures from optimum in the rate of power consumption over prolonged periods of time. Hence the instrument is sensitive to, and transmits a signal by closure of its contacts in accordance with, changes in the rate of power consumption that would hardly be detectable by ordinary power measuring instruments.

*Control motor and feeder motor control.—Figs. 1 and 2*

The watt-hour meter structure described above serves as a commanding instrument for directing a change in the rate at which ore is fed to the grinding mill in response to a change in the rate of power consumption by the mill motor 10. To this end, the rotating contact elements 32, 38 and 39 are connected through the relay circuit to a reversible control motor 45. It will suffice at this point to state that the functioning of the relay circuit is such that when the power consumption of the mill motor 10 increases (meaning that the rate of ore being fed to the ball mill is less than optimum), the speed of rotation of the watt-hour meter shaft 28 increases above the reference speed of rotation of the gear 35, contact element 32 closes with contact element 38, and thereby through the relay circuit the control motor 45 is energized so as to rotate in a counter-clockwise direction (as viewed in the drawing). Conversely, when a decrease in the rate of power consumption by the mill motor 10 occurs (indicating that the rate of feed of ore to the ball mill is greater than optimum), the rate of rotation of the watt-hour meter shaft 28 decreases, contact element 32 closes with contact element 39, and through the relay circuit the control motor 45 is energized to rotate in a clockwise direction. Thus, when the rate of feed of ore to the ball mill is optimum in relation to the rate of power consumption by the ball mill motor 10, the control motor 45 remains unenergized and stationary; but whenever the rate of power consumption by the mill motor increases or decreases in relation to that at the optimum rate of feed of ore to the ball mill, the control motor is energized and rotates, the direction of its rotation being dependent on whether the rate of feed of ore to the mill is above or below the optimum rate.

The control motor drives a shaft 46 to which are connected the feeder motor speed control variable resistors 47 and 48. These variable resistors are respectively connected in series with the field windings of the feeder motors 12 and 13. When the control motor rotates counter-clockwise, the movable contacts of the variable resistors 47 and 48 are correspondingly rotated to increase the resistance in series with the fields of the motors 12 and 13, whereby the rate of feed of ore to the mill is increased. Vice versa, clockwise rotation of the control motor 45 alters the setting of the variable resistors 47 and 48 in a direction to decrease the resistance in series with the field windings of the feeder motors and so to decrease the rate of feed to the ball mill. In this manner, the rate at which the ball mill is fed is automatically controlled and maintained at a value that is optimum with respect to the rate of power consumption by the ball mill motor.

*Neutralizing resistor*

Referring especially to Figs. 1 and 2, the neutralizing resistor 27 comprises a movable contact 49 and a group of independently and individually variable resistors 50a, 50b, etc., connected together in series with stationary contact elements connected to each terminal of each such resistor. As stated above, the neutralizing resistor is connected in series with the potential coils 23 and 24 of the watt-hour meter and with the potential transformer 25. Rotation of the movable contact 49 of the neutralizing resistor in a counter-clockwise direction (as viewed in the drawing) increases the resistance in series with the potential coils and thereby reduces the speed of rotation of the watt-hour meter shaft 28. Rotation of the movable contact 49 in the reverse direction decreases the resistance in series with the watt-hour meter potential coils and so increases the speed of rotation of its shaft 28.

The neutralizing resistor is so connected to the control motor shaft 46 that when the control motor rotates in a direction to increase the speed of the feeder motors 12 and 13 by increasing the resistance in series with their field coils, it also rotates the movable contact 49 of the neutralizing resistor in a direction to increase the resistance in series with the watt-hour meter potential coils, and vice versa. Thus whenever a correction is made in the rate at which the feeder motors 12 and 13 operate in response to a change in the power consumption by the mill motor 10, the watt-hour meter 18 is coincidentally recalibrated so that the speed of rotation of its shaft 28 is brought again toward synchronism with the reference speed of rotation of the gear 35. If the magnitude of the correction made in the rate of feeding material to the ball mill, corresponding to rotation of the movable contact 49 from one stationary contact to the next adjacent one, is sufficient to compensate for the change that has occurred in the ball mill rate of power consumption, then the making of that correction suffices to effect just enough recalibration of the watt-hour meter so that its contact element 32 resumes an open circuit relation with its mating contacts 38 and 39, and the watt-hour meter contact assembly is once more in condition to respond to a further change in the rate of power consumption by the mill motor.

When the control apparatus is originally installed, the independently and individually adjustable resistor elements 50a, 50b, etc., of the neutralizing resistor are adjusted for optimum increments of resistance between each of the neutralizing resistor stationary contacts; and at the same time the variable resistor 26 (by which the calibration of the watt-hour meter may be manually adjusted) is set at its optimum position. Thereafter, only infrequent adjustments in the settings of these resistors are necessary. Indeed, it would be possible to precompute the optimum values of the resistor elements 50a, 50b, etc., of the neutralizing resistor, and to replace these independently variable resistor elements with fixed resistors. However, for flexibility in setting up and adjusting the control apparatus of the invention, it is generally desirable and most convenient to employ variable resistors for the neutralizing resistor elements 50a, 50b, etc.

*Multi-contact switch.—Figs. 1 and 2*

For automatic operation of the new control system, it is of course necessary, once a correction has been made in the rate of operation of the feeder motors 12 and 13, to discontinue operation of the control motor 45 and to prepare the system for response to a command for a further correction. Also, it is desirable that provision be made for setting maximum and minimum limits on the overall magnitude of the corrections that can be made. These functions are performed by the multi-contact switch 51 and by limit switches 55 and 56 associated with it. As previously stated, the movable contact element 52 of the multi-contact switch is mechanically connected to and rotated by the control motor shaft 46, and is electrically connected to one side of the relay power supply line. Alternate stationary contacts 53a of the multi-contact switch are connected together and into the relay circuit. The intervening stationary contacts 53b of the multi-contact switch similarly are all connected together, and are separately connected into the relay circuit. The movable contact element 52 is a little wider than the space between any two adjacent stationary contact elements, so that in moving from one such to the next it makes contact with the stationary contact toward which it is moved before it breaks contact with the one from which it is moved. The normal position of the movable contact 52, as shown in the drawing, is more or less between two stationary contact elements, in contact with one of them and only slightly separated from the other.

The mode of operation of the multi-contact switch is described below in connection with the operation of the relay circuit itself, but its function in the control system can be described at this point as follows: When the movable contact 52 is closed with any one of its stationary contacts 53a or 53b, the relay circuit is prepared to cause rotation of the control motor 45 in one direction or the other upon the closure of the watt-hour meter contact 32 with the appropriate one or the other of its mating contacts 38 and 39. Once the control motor is thereby set in operation, the rotation it imparts to the shaft 46 causes the movable contact 52 to move toward and close with a neighboring stationary contact, and then with a little further movement to break with the stationary contact it had been touching. As soon as the movable contact 52 engages with the neighboring stationary contact element, the relay circuit responds by preparing itself to effect de-energization of the control motor. Such de-energization is consummated when the movable contact 52 breaks contact with the stationary contact element it had been touching, and thereupon rotation of the control motor ceases. At the same time the relay circuit is prepared to cause further energization of the control motor upon the next closure of the watt-hour meter contacts.

Thus the multi-contact switch limits the period of energization of the control motor 45 to that necessary for rotating the shaft 46 through the angle required to move the movable contact 52 of the multi-contact switch from one stationary contact to the next adjacent one; and it correspondingly limits the extent to which a change is made in the rate of operation of the feeder motors 12 and 13. If a correction of this magnitude is sufficient to compensate for the change that has occurred in the rate of power consumption by the ball mill motor, no further correction is made; but if it is insufficient for this purpose, the contacts of the watt-hour meter remain closed and the relay circuit receives another signal for the operation of the control motor to move the movable contact 52 to the next succeeding stationary contact; etc.

The limit switches 55 and 56 are mounted at the limits of travel of the movable contact 52 of the multi-contact switch 51. These limit switches are connected between the relay power supply line and the relay circuit in such a manner as to effect de-energization of the control motor 45 whenever it seeks to effect a correction in the rate of operation of the feeder motors that is beyond the range of the variable resistors 47 and 48. One or the other of the switches is opened whenever the arm carrying the movable contact 52 reaches its limit of travel in one direction or the other. Opening of either one of the limit switches 55 or 56 operates through the relay circuit to prevent any further rotation of the control motor in the direction that would carry the movable contact 52 beyond the intended range of travel, but does not prevent rotation thereof in the reverse direction back into the intended range of travel.

Adjacent to the limit switch 56, at the end of travel of the movable contact 52 corresponding to minimum speed of operation of the feeder motors 12 and 13, is a separate contact element 57. Closure of the contacts 52 and 57 operates through the relay circuit to short circuit the feeder motor control resistors 47 and 48. Incorporation of the contact 57 thereby assures operation of the feeder motors at their lowest speed when a minimum rate of feed of material to the ball mill is called for.

*Relay circuit.—Figs. 1 and 2*

The relay circuit shown above the double dashed line in the drawings, and through which the contact elements of the watt-hour meter 18 and of the multi-contact switch 51 direct operation of the control motor 45, is supplied with power through a relay power line $L_4$, $L_5$. This power line is energized from two legs of the three-phase power line $L_1$, $L_2$, $L_3$ upon closure of relay contacts $L1_o$. These relay contacts are normally opened, but are closed whenever the relay L with which they are associated is energized, and this in turn is accomplished (in the circuit shown in the drawing) from the supply line through which the feeder motors 12 and 13 are energized whenever power is applied to the feeder motors.

In the following description of the relay circuit, the various relays are denoted by capital letters, and the contact elements associated therewith are denoted by corresponding letters followed by Arabic numerals. The subscripts "c" and "o" applied to the contact element reference symbols denote respectively that the contacts are normally closed or normally opened.

The contact element 32 mounted on the watt-hour meter shaft 28 is connected through its brush 33 directly to one side $L_5$ of the relay power supply line. Its associated contact elements 38 and 39 are respectively connected through their brushes 41 and 42 to relays A and A'. These relays are also connected to the other side $L_4$ of the relay power line (relay A' is connected thereto through the limit switch 56), so that one or the other of them is energized upon closure of the watt-hour meter contact element 32 with one or the other of its associated contacts 38 and 39. Thereupon, by closure either of one or the other of the relay contacts $A2_o$ or $A'2_o$, one or the other of the relays D or D' is energized. If it is relay D' that is energized, relay K' is directly energized through contacts $D'1_o$. If it is relay D that is energized, timing relay T is first energized and then at the conclusion of its timing cycle relay K is energized through contacts $T1_o$. Thereby either the contacts $K1_o$ or $K'1_o$ are closed. These contacts are connected to the control motor 45 and to the three-phase power supply line $L_1$, $L_2$, $L_3$. However, the connection to the control motor 45 through the contact $K1_o$ is reversed in comparison with the connection through the contacts $K'1_o$, so that the control motor rotates in one direction upon closure of the contacts $K1_o$ and in the reverse direction upon closure of the contacts $K'1_o$. Hence the direction in which the control motor 45 is caused to rotate depends upon whether the watt-hour meter contact 32 closes with the one or the other of its mating contacts 38 and 39. The energizing circuit for the relay K is made through a normally closed contact $K'1_c$ of the relay K', and similarly the energizing circuit for the relay K' is made through a normally closed contact $K1_c$ of the relay K, so that it is impossible for both of these relays to be energized simultaneously.

Whenever the relay power supply line is energized, a circuit is completed from one side of the relay power line $L_5$ through the multi-contact switch and either the pair of holding relays B and B' or the similar pair of holding relays C and C' to the other side $L_4$ of the relay power line. Which of the pair of relays B and B', or C and C', is energized depends on whether the movable contact 52 of the multi-contact switch is closed with one of the intervening stationary contacts $53a$ or with one of the alternate stationary contacts $53b$. A holding circuit for relay A is prepared upon energization of either of relays B and C and is completed upon closure of contacts $A1_o$; and similarly a holding circuit for relay A' is prepared upon energization of either of relays B' and C' and is completed upon closure of contacts $A'1_o$. Thus, once the watt-hour meter contacts 32 has closed with one of its mating contacts 38 and 39 to energize one or the other of relays A and A', the relay so energized is held energized independently of the watt-hour meter contacts so long as the holding circuit remains completed. It is only when the movable element 52 of the multi-contact switch breaks contact with the stationary contact element $53a$ or $53b$ with which it was initially in contact, that the holding circuit breaks by de-energizing the holding relay through which it was consummated.

The energizing circuit for each holding relay is completed through a normally closed interlock contact associated with its companion holding relay (e. g. the energizing circuit for relay B is through contact $C1_c$, for relay C' it is through contact $B'1_c$, etc.), so that only one of each pair of holding relays can be energized at any given time, and so that one relay of each pair (B and C, and B' and C') must be de-energized before the other can become energized. Therefore, although the holding circuits for the main relays A and A' are re-prepared (say through relays B and B') very promptly after they are broken (say through relays C and C'), they are nonetheless broken for a long enough time, in the interval between de-energization of say relays C and C' and energization of say relays B and B', for the main relays A and A' to become de-energized.

The operation of the relay circuit under the various conditions to which it can respond is described below in outline form:

*Case I.*—Assume that the relay circuit is energized but no signal is transmitted by closure of watt-hour meter contacts.

1. Relay L is energized, as soon as the feeder motors 12 and 13 are set in operation, thereby closing contacts $L1_o$ and energizing the relay power supply line $L_4$, $L_5$.

2. Relays B and B', or relays C and C', are energized, depending on whether the movable contact 52 of the multi-contact switch 51 is closed with stationary contact $53b$ or $53a$.

a. Contacts $B1_o$ and $B'1_o$, or $C1_o$ and $C'1_o$, close, preparing a holding circuit for relays A and A'.

b. Interlock contacts $B1_c$ and $B'1_c$, or $C1_c$ and $C'1_c$, open, preventing energization of relays B and B' simultaneously with C and C'.

3. Relay E is energized, either through contacts $B'2_o$ or contacts $C'2_o$.

a. Contacts $E1_o$ close, preparing a holding circuit for relays I and K through contacts $I2_o$.

If the movable contact 52 of the multi-contact switch 51 is in the position for minimum rate of feed of ore to the grinding mill, in which case it is closed with contact 57, relays G and H are energized, contacts G1o and H1o are closed, and the feeder motor control resistors 47 and 48 are short circuited; also in this case contacts H2o are closed, preparing a circuit for energization of relay F. Otherwise there is no further action on the part of the relay circuit until a signal is transmitted to it by closure of the watt-hour meter contacts.

*Case II.*—Assume that the rate of power consumption by the ball mill motor 10 increases, calling for an increase in the rate of feed to the ball mill, with the movable contact 52 of the multi-contact switch in any position except at either of its limits of travel. By way of example, assume that the movable contact 52 of the multi-contact switch is closed with one of the stationary contacts 53b, having last broken contact with one of the stationary contacts 53a, as shown in the drawings. In this case, relays B and B', and relay E, are energized as outlined in Case I.

1. The increase in the rate of power consumption causes an increase in the rate of rotation of the watt-hour meter shaft 28, with the result that watt-hour meter contact 32 closes with its mating contact 38.

2. Relay A is energized.

*a.* Contacts A1o close, so that relay A is sealed in by the holding circuit through contacts A1o and B1o.

3. Relay D is energized through limit switch 55, contacts A2o, and contacts D'1c, resulting in closure of contacts D1o.

4. Timing relay T is energized through contacts D1o and J1c. At the end of the time interval for which it is set (say about one to two minutes), its contacts T1o close.

5. Relay K is energized through limit switch 55, timer contacts T1o, interlock contacts K'1c, and contacts D'1c.

*a.* Interlock contacts K1c are opened, preventing energization of relay K' so long as relay K remains energized.

6. Contacts K1o close, setting control motor 45 in operation in a direction to increase the rate of operation of the feeder motors 12 and 13.

*a.* As the control motor 45 operates, it rotates the movable contact 49 of the neutralizing resistor in a direction to increase the resistance in series with the potential coils 23 and 24 of the watt-hour meter. Thereby the speed of rotation of the watt-hour meter shaft 28 is reduced, assuring opening of the watt-hour meter contacts 32 and 38 (assuming that the correction effected by operation of the control motor has been adequate to compensate for the change that occurred in the rate of power consumption by the ball mill motor).

7. Simultaneously with energization of relay K, relay I is energized through the same circuit.

*a.* Contacts I2o close, completing the holding circuit for relays I and K through limit switch 55, contacts I2o contacts E1o, the energizing coils of relays I and K, interlock contacts K'1c, and contacts D'1c.

*b.* Contacts I1o close, energizing relay J.

i. Contacts J1c open, de-energizing timing relay T, and contacts T1o open immediately; but relays K and I remain energized through their holding circuits.

8. The control motor continues to rotate until the movable contact 52 of the multi-contact switch makes contact with the adjacent stationary contact 53a and breaks contact with stationary contact 53b. (The movable contact element 52 is wide enough physically to span the space between two adjacent stationary contacts, so that the contact thereof with stationary contact 53a is made before contact with stationary contact 53b is broken.)

*a.* As soon as the movable contact element 52 of the multi-contact switch makes contact with the adjacent stationary contact 53a, a circuit is prepared to energize relays C and C', but these relays remain de-energized so long as the interlock contacts B1c and B'1c are held open on account of relays B and B' being energized through contact of the movable element 52 with the stationary contact 53b of the multi-contact switch.

9. As soon as movable contact 52 breaks contact with stationary contact 53b of the multi-contact switch, relays B and B' are de-energized.

*a.* Holding contacts B1o open, de-energizing relay A.
      i. Contacts A2o open, de-energizing relay D.

*b.* Contacts B'2o open, de-energizing relay E; contacts E1o open, de-energizing relay K; contacts K1o open, de-energizing control motor 45, and this motor thereupon ceases to operate.

*c.* With the opening of contacts E1o, relay I is de-energized, opening contacts I1o and de-energizing relay J; thereupon contacts J1c close, preparing the circuit for subsequent energization of timing relay T.

10. Following de-energization of relays B and B', interlock contacts B1c and B'1c close, energizing relays C and C' through the stationary contact 53a of the multi-contact switch. Thereby a holding circuit for relays A and A' is again prepared for use upon the next energization of either of these relays.

*a.* Upon energization of relay C', closing contacts C'2o, relay E is again energized, its contacts E1o are again closed, and the holding circuit for relays I and K is thus again prepared.

Thereupon the relay circuit is restored to the condition prevailing prior to closure of the watt-hour meter contacts, and it is again ready to respond to a further closure of such contacts.

*Case III.*—Assume that the rate of power consumption by the ball mill motor 10 decreases, calling for a decrease in the rate of feed to the ball mill, with the movable contact 52 of the multi-contact switch in any position except at either of its limits of its travel. By way of example, assume that the movable contact 52 is closed with one of the stationary contacts 53a, having last broken contact with one of the stationary contacts 53b. In this case, relays C and C', and relay E, are energized as outlined in Case I.

1. The decrease in the rate of power consumption causes a decrease in the rate of rotation of the watt-hour meter shaft 28, with the result that watt-hour meter contact 32 closes with its mating contact 39.

2. Relay A' is energized through limit switch 56.

*a.* Contacts A'1o close, so that relay A' is sealed in by the holding circuit through limit switch 56 and contacts C'1o and A'1o.

3. Relay D' is energized through limit switch 56 and contacts A'2o, resulting in opening of interlock contacts D'1c and closing contacts A'1o.

4. Relay K' is energized directly, through interlock contacts K1c, upon closure of contacts D'1o.

*a.* Interlock contacts K'1c open, preventing energization of relay K so long as relay K' remains energized.

5. Contacts K'1o close, setting control motor 45 in operation in a direction to decrease the rate of operation of the feeder motors 12 and 13.

*a.* As the control motor 45 operates, the movable contact 49 of the neutralizing resistor is moved in a direction to decrease the resistance in series with the potential coils 23 and 24 of the watt-hour meter. Thereby the speed of rotation of the watt-hour meter shaft is increased, bringing it back into synchronism with the gear 35 and opening the watt-hour meter contacts 32 and 39 (provided the correction effected by operation of the control motor has been adequate to compensate for the change that occurred in the rate of power consumption by the ball mill motor).

6. The control motor continues to operate until the movable contact 52 of the multi-contact switch first closes with a stationary contact 53b and then breaks with stationary contact 53a.

a. Upon closure of the movable contact 52 with stationary contact 53b, a circuit is prepared for energization of relays B and B', but these relays do not become energized so long as interlock contacts C1c and C'1c are held open by energization of relays C and C'.

7. As soon as movable contact 52 breaks contact with the stationary contact 53a, relays C and C' are de-energized.

a. Holding contacts C'1o open, de-energizing relay A'.
    b. Contacts A'2o open, de-energizing relay D'; contacts D'1o open, de-energizing relay K'; contacts K'1o open, de-energizing control motor 45, and this motor thereupon ceases to operate.

8. Following de-energization of relays C and C', interlock contacts C1c and C'1c close, energizing relays B and B' through the stationary contact 53b of the multi-contact switch. Thereby a holding circuit for relays A and A' is again prepared for use upon the next energization of either of these relays.

Thereupon the relay circuit is restored to the condition prevailing prior to closure of the watt-hour meter contacts, and it is again ready to respond to a further closure of such contacts.

*Case IV.*—Assume that the movable contact 52 of the multi-contact switch is at the right-hand limit of its travel holding limit switch 56 open and making contact with stationary contacts 57 and 53a. In this case, relays C and C' and E are energized as outlined in Case I. Also, through contact of the movable contact 52 of the multi-contact switch with the stationary contact 57, relays G and H are energized, so that contacts G1o, H1o and H2o are all closed. The feeder motor control resistors 47 and 48 are short circuited by closure of contacts G1o and H1o.

A. The movable contact element 52 is in this case in its position for minimum rate of feed to the ball mill, for with limit switch 56 held open, a decrease in the rate of power consumption by the ball mill motor 10, resulting in closure of watt-hour meter contacts 32 and 39, cannot effect energization of relay A'. A decrease in the rate of power consumption therefore can have no effect in bringing about operation of the control motor 45.

B. If in this case the rate of power consumption by the ball mill motor 10 increases, calling for an increase in the rate of feed to the ball mill, the rate of rotation of the watt-hour meter shaft 28 increases and watt-hour meter contact 32 closes with its mating contact 38.

1. Relay A is energized.
    a. Contacts A1o close so that relay A is sealed in by the holding circuit through contacts A1o and C1o.
2. Relay D is energized through limit switch 55, contacts A2o, and contacts D'1c, resulting in closure of contacts D1o.
3. Timing relay T is energized through contacts D1o and J1c. Simultaneously, relay F is energized through contacts D1o and H2o, resulting in closure of contacts F1o.
4. Relay K is energized through limit switch 55, contacts F1o, contacts K'1c, and contacts D'1c.
    a. Interlock contacts K1c are opened, preventing energization of relay K'.
5. Contacts K1o close, setting control motor 45 in operation, as in Case II.
6. Simultaneously with energization of relay K, relay I is energized through the same circuit.
    a. Contacts I2o close, completing the holding circuit for relays I and K through limit switch 55, contacts I2o, contacts E1o, the energizing coils of relays I and K, interlock contacts K'1c, and contacts D'1c.
    b. Contacts I1o close, energizing relay J.
        i. Contacts J1c open, de-energizing timing relay T. In this case, de-energization of relay T occurs before expiration of the time interval for which it is set, so that its contacts have never closed.
7. As the control motor rotates, it causes the movable contact 52 of the multi-contact switch to break contact with stationary contact 57, resulting in de-energization of relays G and H.
    a. Contacts G1o and H1o open, so that as the control motor shaft rotates, the feeder motor variable resistors 47 and 48 effect an increase in the rate of feed to the ball mill.
    b. Contacts H2o open, de-energizing relay F; contacts F1o open, but relays I and K remain energized through their holding circuit.
8. The control motor continues to rotate until the movable contact 52 of the multi-contact switch makes contact with the adjacent stationary contacts 53b and breaks contact with stationary contact 53a. In the course of this movement, the limit switch 56 automatically recloses. At this point, the relay circuit is in a similar condition as at the corresponding point in the cycle of operations described in Case II above, and its further operation is therefore similar to that described in paragraphs 8 to 10 of that case.

*Case V.*—Assume that the movable contact 52 of the multi-contact switch is at the left-hand limit of its travel in contact with stationary contact 53a and holding limit switch 55 open. In this case relays C and C' and relay E are energized as outlined in Case I.

A. In this case, the multi-contact switch is in its position corresponding to the maximum rate of feed to the ball mill. Should a further increase occur in the rate of power consumption by the ball mill motor 10, resulting in closure of watt-hour meter contacts 32 and 38, relay A will be energized and its holding circuit will be completed as in Case II, but no further action will ensue because with limit switch 55 open, relay D does not become energized upon closure of contacts A2o.

B. If a decrease occurs in the rate of the power consumption by the ball mill motor 10, resulting in closure of the watt-hour meter contacts 32 and 39, relay A' is energized and the control system operates as described in Case III above. If relay A happens to have been energized while limit switch 55 was open, then when this switch recloses upon movement of the movable contact 52 away from its left-hand limit of travel, relay D still remains de-energized because the interlock contacts D'1c have been opened by the energization of relay D'; and relay D' does not become de-energized until the holding circuits through relays A and A' have both opened.

*Alternative operation of variable resistors.—Fig. 3*

The control apparatus described above is predicated on the use of the control motor 45 to vary the settings of the neutralizing and variable speed control resistors 27, 47 and 48. An alternative design of the control apparatus, in which relays are employed to vary the effective resistance of these variable resistors, is shown in Fig. 3. Except for the manner in which the effective resistance of the neutralizing and speed control resistors is varied, and except for changes necessitated thereby in the relay circuit, the control apparatus of Fig. 3 is the same as that of Figs. 1 and 2; and the reference numerals used on Fig. 3 correspond to those used on Figs. 1 and 2 where they denote components that are common to both alternative forms of the control apparatus. The mill motor 10 and its power supply, the feeder motors 12 and 13 and their power supply, the watt-hour meter commanding instrument and its connection to the mill motor power supply, and the relay circuit power supply, are all the same in the control system of Fig. 3 as described above with respect to Figs. 1 and 2. Also, a variable neutralizing resistor 60 in series with the potential coils of the watt-hour meter, and variable feeder motor speed control resistors 61 and 62 in series with the field windings of the feeder motors 12 and 13 are provided for the same purpose, and they function in the same manner respectively, as the variable resistors 27, 47 and 48 of Figs. 1 and 2.

The major difference in the control apparatus of Fig. 3 as compared with that of Figs. 1 and 2 resides in the control means provided for varying the effective resistance of the neutralizing and speed control resistors 60, 61 and 62. These resistors, instead of being provided with a movable tap, are provided with a series of fixed taps 60a, 60b, 61a, 61b, 62a, etc., and successive pairs of these pairs of these taps are respectively connected to normally closed contacts N1c, N2c, N3c, N'1c, N'2c, N'3c, N''1c, N''2c, and N''3c, of a series of relays N, N', and N''. When any one of the relays N, N' and N'' is de-energized the increment of resistance of the resistors 60, 61 and 62 lying between the fixed taps connected to the normally closed contacts of that relay is shunted and thus is effectively removed from the resistor circuit. By energizing one or more of the relays N, N' and N'', one or more increments of the neutralizing resistor 60 is placed effectively in series with the potential coils of the watt-hour meter 18, and one or more corresponding increments of the feeder motor control resistors 61 and 62 is placed effectively in series with the field windings of the feeder motors 12 and 13. Thus the neutralizing resistor 60 and the feeder motor speed control 61 and 62 are effectively varied by energizing or de-energizing one or more of the relays N, N' and N''.

Energization of the relays N, N' and N'' is controlled by a circuit denoted in Fig. 3 by the block marked "Control Relay Circuit," and the actuation of this circuit is in turn controlled by additional relay elements in a circuit denoted in Fig. 3 by the block marked "Master Relay Circuit" to which the contacts 38 and 39 of the watt-hour meter are connected. The master relay circuit embodies an arrangement of relays designed to discriminate between signals calling for an increase in the rate of operation of the feeder motors and signals calling for a decrease in the rate of operation of the feeder motors. The control relay circuit embodies an arrangement of relays through which the relays N, N' and N'' are successively energized or de-energized, depending on whether the signal transmitted to the master relay circuit through the contacts of the watt-hour meter calls for an increase or decrease in the rate of operation of the feeder motors. The particular design of the master and control relay circuits forms no part of the present invention, and is well within the skill of the art. Indeed, there is no single unique design for either of these relay circuits; any number of such circuits can be designed to operate successfully in the apparatus shown in Fig. 3.

With the omission of the control motor from the form of control apparatus shown in Fig. 3 and the substitution therefor of a relay circuit control means, the multi-contact switch 51 of the apparatus shown in Fig. 1 likewise is omitted, and its function of preparing the master relay circuit to respond to a new signal from the watt-hour meter, after a previous signal has been answered by an appropriate change in the setting of the variable resistors, is taken over by the inclusion of suitable circuitry in the master relay circuit (advantageously, one or more time-delay relays can be embodied in the master relay circuit to prepare this circuit for response to a new signal after a suitable interval of time following reception of and response to the previous signal).

The modified form of control apparatus shown in Fig. 3 has the advantage of eliminating mechanical operation of the variable neutralizing and feeder motor speed control resistors. It is particularly useful in control systems in which the number of control steps required, corresponding to the number of resistor increments and the number of shunting relays N, N', etc., is not very large. If it is desirable for the control system to embody a considerable number of control steps which would necessitate a corresponding considerable number of relays N, N', etc., then the relay circuitry required for the form of apparatus shown in Fig. 3 becomes rather involved; in such case it is generally preferable to employ apparatus of the character shown in Figs. 1 and 2, in which the same relay circuit can be used regardless of the number of control steps by simply increasing the number of stationary contacts with which the multi-contact switch 51 is provided.

*Results obtained*

The control apparatus above described has been found to be both practical and effective in actual use. An embodiment substantially in the form described and employed to control the ore feed to a ball mill in a copper concentrator plant resulted in securing a substantial increase in the amount of ore ground per day and in achieving a substantial reduction in the power consumption per ton of ore ground. In this concentrator plant the practice heretofore has been to control the feed to the ball mills manually. Over a trial period of one month, in a mill unit thus manually controlled, an average of 76.2 tons of ore per hour were ground, at an average power consumption of 7.42 kilowatt hours per ton. During the same month, in another mill unit equipped with the new control apparatus and handling ore from the same source, the amount of ore ground averaged 83.3 tons per hour at an average power consumption of 7.01 kilowatt hours per ton. Moreover, the new control system effects a further saving by eliminating the need for continually checking and adjusting the rate of feed to the mill.

Although the new control apparatus has been described with particular reference to its use in controlling the feed to a ball mill, it is apparent that it can be employed for a wide variety of other purposes. Despite its seeming complexity, it is made up from simple and readily available components. The rotating contacts of the watt-hour meter (or whatever other commanding instrument is used) enables the control to integrate deviations over a long period of time in the rate of power consumption or other quantity to which the control device is made responsive, with the result that it responds reliably and effectively to deviations so small as to be barely detectable by ordinary control instruments. The new control apparatus is entirely automatic in its operation, and requires only a minimum of maintenance attention.

I claim:

1. The combination with a source of electric power, a mill motor having a power input connectable to said source and a feeder motor, of apparatus for controlling the operation of said feeder motor in accordance with the rate of power consumption of said mill motor, comprising a power measuring instrument connected to said power input of the mill motor and having a shaft rotatable at a speed determined by the rate of power consumption of the mill motor, a first contact element mounted on said shaft for rotation in an orbit about the shaft axis, a second contact element rotatable in the same orbit, means for rotating said second contact element at a predetermined constant speed, whereby said contacts close whenever the speed of rotation of said shaft differs over a period of time from said predetermined speed, electrical control means connected in circuit with said contacts and said power source, so as to be actuated upon closure of said contacts, and a feeder motor control device operable in response to actuation of said control means and connected in circuit with said feeder motor, whereby a change in the rate of power consumption of said mill motor which causes said instrument shaft to rotate at a speed other than said predetermined speed results in actuating the control means and thereby in controlling the operation of the feeder motor.

2. The combination with a source of electric power, a mill motor having a power input connectable to said source and a feeder motor, of apparatus for controlling the operation of said feeder motor in accordance with the rate of power consumption of said mill motor, comprising a power measuring instrument connected to said power input of the mill motor and having a shaft rotatable at a speed determined by the rate of power consumption of the mill motor, a first contact element mounted on said shaft for rotation therewith in an orbit about the shaft axis, a second contact element rotatable in the same orbit, means for rotating said second contact element at a predetermined constant speed, whereby said contacts close whenever the speed of rotation of said shaft differs over a period of time from said predetermined speed, a control motor, a relay circuit which when actuated connects said control motor to said power source, said contacts being connected to said relay circuit and said power source for actuating the relay circuit upon closure of the contacts, a feeder motor speed control device and a multi-contact switch both mechanically driven by said control motor, said control device being connected in circuit with the feeder motor and serving to effect a change in the speed thereof whenever said control motor is set in operation in response to a change in the rate of power consumption of said mill motor, and said multi-contact switch being connected between said source of power and said relay circuit to effect de-energization of the control motor when the motor has rotated through an angular distance sufficient to change the setting of said switch.

3. The combination with a source of electric power, a mill motor having a power input connectable to said source and a feeder motor, of apparatus for controlling the operation of said feeder motor in accordance with the rate of power consumption of said mill motor, comprising a power measuring instrument having a shaft rotatable at a speed determined by the rate of power consumption of the mill motor, said instrument being connected to said power input of the mill motor through a variable resistor by which the speed of rotation of said shaft relative to the mill motor power consumption may be varied, a first contact element mounted on said shaft for rotation therewith in an orbit about the shaft axis, a second contact element independently rotatable in the same orbit, means for rotating said second contact element at a predetermined constant speed, whereby said contacts close whenever the speed of rotation of said shaft differs over a period of time from said predetermined speed, electrical control means connected in circuit with said contacts and said power source so as to be actuated upon closure of said contacts, and a feeder motor control device operable in response to actuation of said control means and connected in circuit with said feeder motor, said variable resistor also being operable by said control means, whereby a change in the rate of power consumption of the mill motor which causes said instrument shaft to rotate at a speed other than said predetermined speed effects actuation of said control means with the result that the feeder motor control device is operated to change the speed of said feeder motor concurrently with a change in the setting of said variable resistor such as to restore the speed of rotation of the instrument shaft substantially to said predetermined speed.

4. In apparatus comprising a device consuming electric power, a control motor, a source of power, and control circuit means through which said control motor is connected to said power source for operation in response to a change in the rate of power consumption of said device, the improvement comprising a watt-hour meter connected to said device, means responsive to an actual change in the rate of power consumption of said device as indicated by said watt-hour meter for actuating said control circuit to effect operation of the control motor, a variable resistor mechanically connected to and varied by operation of said control motor, said variable resistor being connected in circuit withh said device and said watt-hour meter, whereby operation of the control motor in response to a changed rate of power consumption by the device as measured by the watt-hour meter alters the resistance in circuit with said meter and thereby restores its indication of the rate of power consumption of said device to the value prevailing prior to said actual change in the rate of power consumption.

5. The combination with an A. C. power source, a mill motor having a power input connectable to said source and a feeder motor, of apparatus for controlling the operation of said feeder motor in response to change in the rate of power consumption of said mill motor, substantially independently of frequency variations of said source, comprising a motor of watt-hour-meter type connected to the mill motor power input and having a shaft rotatable at a speed determined by the rate of power consumption of the mill motor, a first contact element mounted on said shaft for rotation therewith in an orbit about the shaft axis, a second contact element rotatable in the same orbit, a synchronous motor connected in driving relation with said second contact element for rotating it in said orbit at a predetermined constant speed, whereby said contacts close whenever the speed of rotation of said shaft differs over a period of time from said predetermined speed, said synchronous motor being energized from said A. C. power source, whereby any fluctuation in the frequency of said power source that produces a change in speed of rotation of the watt-hour-meter motor shaft also produces a corresponding change in the speed of rotation of the synchronous motor and so does not cause any significant change in the speeds of rotation of said first and second contacts relative to each other in their common orbit, electrical control means connected in circuit with said contacts and with said power source, so as to be actuated upon closure of said contacts, and a feeder motor control device operable in response to actuation of said control means and connected in circuit with said feeder motor, whereby a change in the rate of power consumption of said mill motor which causes said watt-hour-meter motor shaft to rotate at a speed other than said predetermined speed results in actuating the control means and thereby in controlling the operation of the feeder motor.

6. The combination with an electric power source, a mill motor having a power input connectable to said source, and a feeder motor, of apparatus for controlling the operation of said feeder motor in response to change in the rate of power consumption by said mill motor, comprising a power measuring instrument connected to said power input of the mill motor and having a shaft rotatable at a speed determined by the rate of power consumption of the mill motor, a first contact element mounted on said shaft for rotation therewith in an orbit about the shaft axis, a second contact element rotatable in the same orbit, means for rotating said second contact element at a predetermined constant speed, whereby said contacts close whenever the speed of rotation of said shaft differs over a period of time from said predetermined speed, a control motor, a relay circuit including a main relay, first and second holding relays, and a control motor relay, a feeder motor speed control device connected to said feeder motor, a multi-contact switch having a movable contact element and a series of alternate and intervening stationary contact elements, said speed-control device and said movable contact element being both mechanically connected to and driven by said control motor, circuit means for energizing said first holding relay and for de-energizing said second holding relay when said movable contact is closed with any alternate stationary contact of the multi-contact switch, circut means for energizing said second holding relay and for de-energizing said first holding relay whenever said movable contact is closed with any intervening stationary contact of said multi-contact switch, circuit means for energizing said main relay upon closure of said rotatable instrument contacts, circuit means for energizing said control motor relay upon energization of said main relay, circuit means for actuating said control motor upon energization of said control motor relay, and a main relay holding circuit through whichever of said holding relays is energized and which is completed upon energization of said main relay for holding said main relay energized, whereby said control motor continues to operate once it has been actuated following closure of said instrument contacts until it has moved the movable contact of the multi-contact switch from one stationary contact to the next and has thereby de-energized the holding relay through which the main holding circuit was completed.

7. The combination with a device and with apparatus for regulating the operation of said device in response to a change in some measurable quantity, of control apparatus comprising a measuring instrument responsive to said quantity and having normally open contacts which close upon the occurrence of a change in said quantity, a control motor, a relay circuit including a main relay, first and second holding relays, and a control motor relay, a multi-contact switch having a movable contact element and a series of alternate and intervening stationary contact elements, said regulating apparatus and said movable contact element being both mechanically connected to and driven by said control motor, circuit means for energizing said first holding relay and for de-energizing said second holding relay when said movable contact is closed with any anternate stationary contact of the multi-contact switch, circuit means for energizing said second holding relay and for de-energizing said first holding relay whenever said movable contact is closed with any intervening stationary contact of said multi-contact switch, circuit means for energizing said main relay upon closure of said instrument contacts, circuit means for energizing said control motor relay upon energization of said main relay, circuit means for actuating said control motor upon energization of said control motor relay, and a main relay holding circuit through whichever of said holding relays is energized and which is completed upon energization of said main relay for holding said main relay energized, whereby said control motor continues to operate once it has been actuated following closure of said instrument contacts until it has moved the movable contact of the multi-contact switch form one stationary contact to the next and has thereby de-energized the holding relay through which the main relay holding circuit was completed.

8. The combination with an electric power source, a mill motor having a power input connectable to said source, and a feeder motor, of apparatus for controlling the operation of said feeder motor in response to change in the rate of power consumption by said mill motor, comprising a power measuring instrument having a shaft rotatable at a speed determined by the rate of power consumption of the mill motor, said instrument being connected to said power input of the mill motor through a variable resistor by variation of which the speed of rotation of said shaft relative to the mill motor power consumption may be varied, a first contact element mounted on said shaft for rotation therewith in an orbit about the shaft axis, a second contact element independently rotatable in the same orbit, means for rotating said second contact element at a predetermined constant speed, whereby said contacts close whenever the speed of rotation of said shaft differs over a period of time from said predetermined speed, a control motor, a relay circuit including a main relay, first and second holding relays, and a control motor relay, a feeder motor speed control device connected to said feeder motor, a multi-contact switch having a movable contact element and a series of alternate and intervening stationary contact elements, said variable resistor and said speed control device and said movable contact element all being mechanically connected to and driven by said control motor, circuit means for energizing said first holding relay and for de-energizing said second holding relay when said movable contact is closed with any alternate stationary contact of the multi-contact switch, circuit means for energizing said second holding relay and for de-energizing said first holding relay whenever said movable contact is closed with any intervening stationary contact of said multi-contact switch, circuit means for energizing said main relay upon closure of said rotatable instrument contacts, circuit means for energizing said control motor relay upon energization of said main relay, circuit means for actuating said control motor upon energization of said control motor relay, and a main relay holding circuit through whichever of said holding relays is energized and which is completed upon energization of said main relay for holding said main relay energized, whereby said control motor when set in operation by closure of said instrument contacts operates said variable resistor to bring the speed of rotation of said instrument shaft toward synchronism with said predetermined speed and so to open said instrument contacts, but whereby said control motor continues to operate once it has been actuated following closure of said instrument contacts until it has moved the movable contact of the multi-contact switch from one stationary contact to the next and has thereby de-energized the holding relay through which the main relay holding circuit was completed.

9. The combination with a device and with apparatus for regulating the operation of said device in response to some measurable electrical quantity and with a source of said quantity, of an instrument having a rotatable shaft and electrical means for exerting on said shaft a torque which is a function of the magnitude of said measurable quantity, a first contact element mounted on said shaft, a second contact element mounted in position to close with said first contact element whenever the instrument shaft rotates beyond a predetermined range of positions relative to said second contact, control circuit means connected to said regulating apparatus and to said contacts, whereby said regulating apparatus is operated upon closure of said contacts, a variable resistor, an electrical circuit connecting said source of the measurable electrical quantity to the instrument torque-exerting means through said variable resistor, and means operable by said control circuit means for varying said variable resistor, said electrical means being so proportioned that a change in said measurable quantity sufficient to effect closure of said contacts, and thereby to effect actuation of the control apparatus, simultaneously changes the setting of said variable resistor and so causes a change in the torque exerted on the instrument shaft, said resistor being connected so that said change of torque is in the direction of returning said instrument shaft to said predetermined range of positions in which said contacts are open.

10. In apparatus including a device consuming electric power, a power source, means for connecting the power input of said device to said power source, electrical control means and a control circuit through which said control means is connectable to said power source for operation in response to changes in the rate of power consumption of said device, the improvement comprising a power-consumption-responsive instrument having a shaft, energizing means including an actuating coil for rotating said shaft at a speed which is a function of the rate of power consumption of said device, a contact secured to said shaft and disposed to rotate therewith in an orbit about the axis of siad shaft, constant speed motor means having a second shaft, a second contact secured to said second shaft and disposed for rotation at a predetermined reference speed in the same orbit as said first contact independently of rotation of said first shaft, means connecting said contacts in series between said control circuit and said power source such that, when closed, said contacts connect said control circuit to said power source whereby said control means is actuated in response to momentary closure of said contacts when said first contact rotates at a speed different from that of said second contact, means including an adjustable resistor connected to couple said energizing means to the power input of said device, and adjusting means for said resistor actuated by said control means operable to adjust the resistance of said resistor in a direction and to a degree to bring the speed of rotation of said contacts into synchronism when said contacts are opened following said momentary closure thereof.

11. Apparatus according to claim 10 in which said power source is of the alternating-current type and which includes a connection from said motor means to said power source whereby said motor means and said instrument are operated by the same power source so that frequency variations of said source affect both said means proportionally.

12. In apparatus including a device consuming electric power, an electric power source, means for connecting the power input of said device to said source, electric control means, and control circuit means through which said control means is connectable to said power source for operation in response to changes in the rate of power consumption of said device, the improvement comprising a motor of the watt-hour meter type coupled to the power input of said device, means responsive to operation of said motor which represents a given change in the rate of power consumption of said device for actuating said control circuit to effect operation of said control means, and resistor means adjustable in response to the operation of said control means, said resistor means being connected in circuit between said motor and said power input, and the operation of said control means in response to said given change in rate of power consumption by said device being such as to alter the resistance of said resistor means in a direction and to an extent to restore the operation of said motor to that prevailing prior to said change in the rate of power consumption.

References Cited in the file of this patent

UNITED STATES PATENTS

| | | |
|---|---|---|
| 1,647,337 | Bradshaw | Nov. 1, 1927 |
| 1,818,963 | Tolson | Aug. 11, 1931 |
| 1,842,769 | Schleicher | Jan. 26, 1932 |
| 1,905,766 | Thompson | Apr. 25, 1933 |
| 2,491,466 | Adams | Dec. 20, 1949 |
| 2,491,983 | King | Dec. 20, 1949 |